(12) United States Patent
Yoneyama

(10) Patent No.: US 6,428,186 B1
(45) Date of Patent: Aug. 6, 2002

(54) HEADLAMP FOR A VEHICLE

(75) Inventor: Masatoshi Yoneyama, Shizuoka (JP)

(73) Assignee: Koito Manufacturing Co., Inc., Tokyo (JP)

(*) Notice: Subject to any disclaimer, the term of this patent is extended or adjusted under 35 U.S.C. 154(b) by 0 days.

(21) Appl. No.: 09/553,529

(22) Filed: Apr. 20, 2000

(30) Foreign Application Priority Data

Apr. 21, 1999 (JP) .............................. 11-114243

(51) Int. Cl.[7] ................................................ B60Q 1/00
(52) U.S. Cl. ...................................... 362/265; 362/546
(58) Field of Search ................................. 362/240, 247, 362/267, 265, 505, 538, 543, 544, 546, 549

(56) References Cited

U.S. PATENT DOCUMENTS

| | | |
|---|---|---|
| 5,678,916 A | 10/1997 | Watanabe et al. |
| 5,895,113 A | 4/1999 | Ozaki et al. |
| 5,941,633 A | 8/1999 | Saito et al. |

*Primary Examiner*—Y. My Quach-Lee
(74) *Attorney, Agent, or Firm*—Fish & Richardson P.C.

(57) ABSTRACT

A headlamp for a vehicle is disclosed that includes a reflector for supporting a discharge bulb in a lamp chamber formed by a lamp body and a front lens, and a lighting circuit unit for lighting the discharge bulb attached to an outer surface of a lower wall of the lamp body. The headlamp includes a unit cover attached to the outer surface of the lower wall covering the lighting circuit unit and an upright wall formed on the lamp body in front of the unit cover. The upright wall projects downwardly to a position lower than a surface of a front end portion of the unit cover.

8 Claims, 5 Drawing Sheets

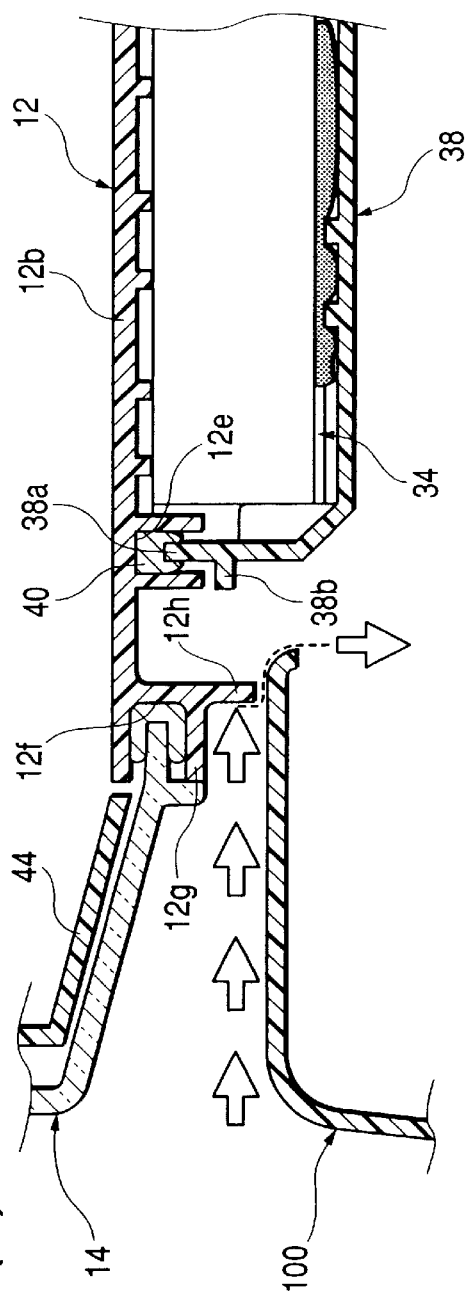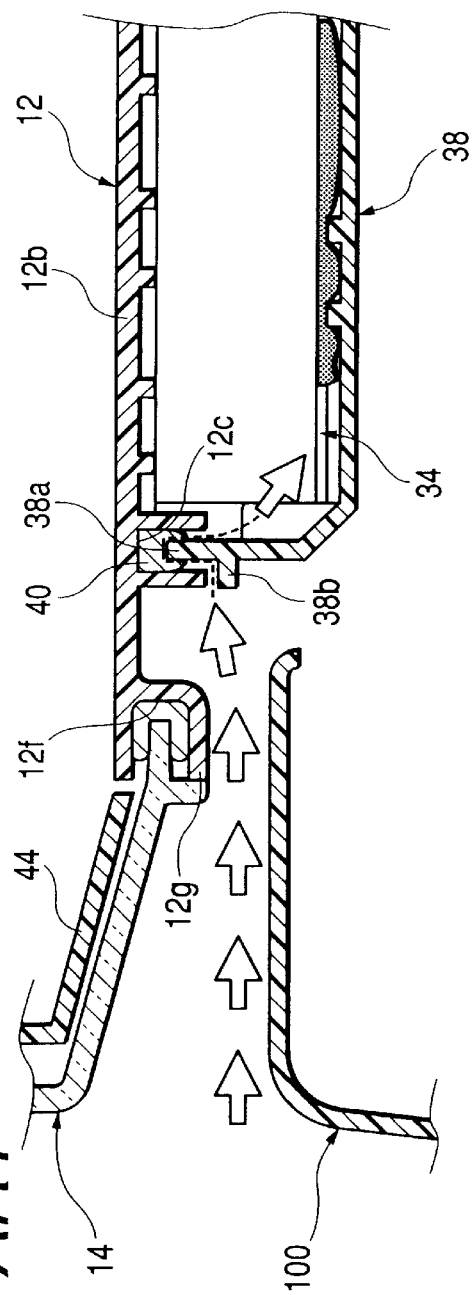
FIG. 3(a)
FIG. 3(b) PRIOR ART

HEADLAMP FOR A VEHICLE

BACKGROUND OF THE INVENTION

The present invention relates to a headlamp for a vehicle having a discharge bulb.

Headlamps for vehicles have recently begun to use a discharge bulb capable of high-luminance illumination as a light source bulb. A headlamp for a vehicle equipped with such a discharge bulb requires a lighting circuit unit for lighting the discharge bulb and, as shown in FIG. 4, this lighting circuit 2 is often attached to an outer surface of a lower wall 4a of a lamp body 4. When the lighting circuit 2 is attached to the outer surface of the lower wall 4a of the lamp body 4, it is necessary to ensure that the lighting circuit is waterproofed so that water does not enter the interior of the lighting circuit unit 2. Water may attempt to enter during high-pressure car washing or traveling in rainy weather, and if successful, would cause a failure of the lighting circuit. Thus, conventional lamp designs using lighting circuit units become complex and expensive to manufacture.

In addition, the lighting circuit unit 2 is relatively heavy, and if a completely waterproof design is adopted for this unit, its weight becomes very large. When the lighting circuit is heavy, the lower wall 4a of the lamp body 4 is liable to undergo flexing and deform due to the weight of the lighting circuit unit 2, with the result that a lens seal groove 4b of the lamp body 4 is also liable to become deformed. If deformation occurs in the lens seal groove 4b, there is a possibility that faulty sealing occurs between the lamp body 4 and a front lens 6.

SUMMARY OF THE INVENTION

The present invention has been devised to address the above-described circumstances, and provides a headlamp for a vehicle in which a lighting circuit unit is attached to an outer surface of a lower wall of a lamp body in a waterproof manner.

The structure ensures that water will not affect the lighting circuit unit which enables the lighting circuit unit to be made with light weight and at low cost. The light weight makes it possible to effectively prevent the occurrence of faulty sealing between the lamp body and the front lens.

The invention includes attaching a predetermined unit cover on the outer surface of the lower wall of the lamp body, and forming a predetermined upright wall at a position located forwardly of the unit cover. In accordance with a first aspect of the invention, a headlamp for a vehicle having a reflector for supporting a discharge bulb in a lamp chamber formed by a lamp body and a front lens includes a lighting circuit unit for lighting the discharge bulb attached to an outer surface of a lower wall of the lamp body. A unit cover attached to the outer surface of the lower wall covers the lighting circuit unit, and an upright wall formed on the lamp body in front of the unit cover projects downward to a position lower than that surface of a front end portion of the unit cover.

In accordance with a second aspect of the invention, in the headlamp for a vehicle according to the first aspect of the invention, the upright wall is formed on an outer wall portion of a lens seal groove where the front lens is attached in the lamp body.

The lighting circuit unit and the unit cover may be respectively arranged to be attached to the lamp unit independently, or the unit cover and lighting circuit may be a unit that together are attached to the lamp unit.

As long as the upright wall is formed over a range at least wider than the horizontal width of the unit cover, the width of the upright wall is not particularly limited.

As shown in the above-described arrangement, the headlamp for a vehicle in accordance with the invention is structured such that although a lighting circuit unit is attached to an outer surface of a lower wall of the lamp body, a unit cover covering the lighting cirucit unit is attached to the outer surface of the lower wall, and an upright wall is formed on the lamp body forwardly on the unit cover in such a manner as to project downward to a position lower than that surface of a front end portion of the unit cover. Therefore, it is possible to obtain the following advantages in operation.

Since the unit cover is attached to the outer surface of the lower wall of the lamp body, even if the lighting circuit unit is not provided with a completely waterproof structure, the sealing property for sealing between the lamp body and the unit cover can be secured, so that it is possible to prevent the entrance of water into the interior of the lighting circuit unit. Therefore, the structure of the lighting circuit unit can be simplified, thereby making it possible to lower the weight of the lighting circuit unit and attain a reduction in cost.

In addition, since an upright wall is formed on the lamp body in front of the unit cover in such a manner as to project downwardly to a position lower than that surface of a front end portion of the unit cover which opposes the lamp body unit, it is possible to prevent water from being splashed against the contact surfaces of the unit cover and the lamp body from the forward direction during high-pressure car washing or traveling in rainy weather. Accordingly, it is possible to prevent a situation where water enters the interior of the unit cover through the contact surfaces of the unit cover and the lamp body and wet the lighting circuit unit.

Furthermore, the upright wall reduces the possibility of the lens seal groove of the lamp body becoming deformed due to the weight of the lighting circuit unit (although its weight is alleviated to some extent, as mentioned above).

Accordingly, a headlamp in accordance with the invention where the lighting circuit unit is attached to the outer surface of the lower wall of the lamp body makes it possible to ensure waterproofness for the lighting circuit unit and structure the lighting circuit unit with light weight at low cost. At the same time, it is possible to effectively prevent the occurrence of faulty sealing between the lamp body and the front lens.

In the above-described arrangement, as stated in the second aspect of the invention, if the upright wall is formed on the outer wall portion of the lens seal groove, it is possible to enhance the rigidity of the portion surrounding the lens seal groove of the lamp body. Consequently, it is possible to prevent the deformation of the lens seal groove of the lamp body more effectively. In addition, since the outer wall portion of the lens seal groove is generally at a position lower than the lower wall of the lamp body, the vertical length of the upright wall can be set to be slightly shorter.

The above features and advantages of the present invention will become more apparent from the following detailed description of the invention when read in conjunction with the accompanying drawings.

BRIEF DESCRIPTION OF THE DRAWINGS

FIG. 3A is an enlarged, detailed view of a portion of FIG. 1;

FIG. 3B is an enlarged diagram of a conventional headlamp for a vehicle which does not include an upright wall.

DETAILED DESCRIPTION

Referring to the accompanying drawings, a description will be given of an embodiment of the invention.

Figure 1:
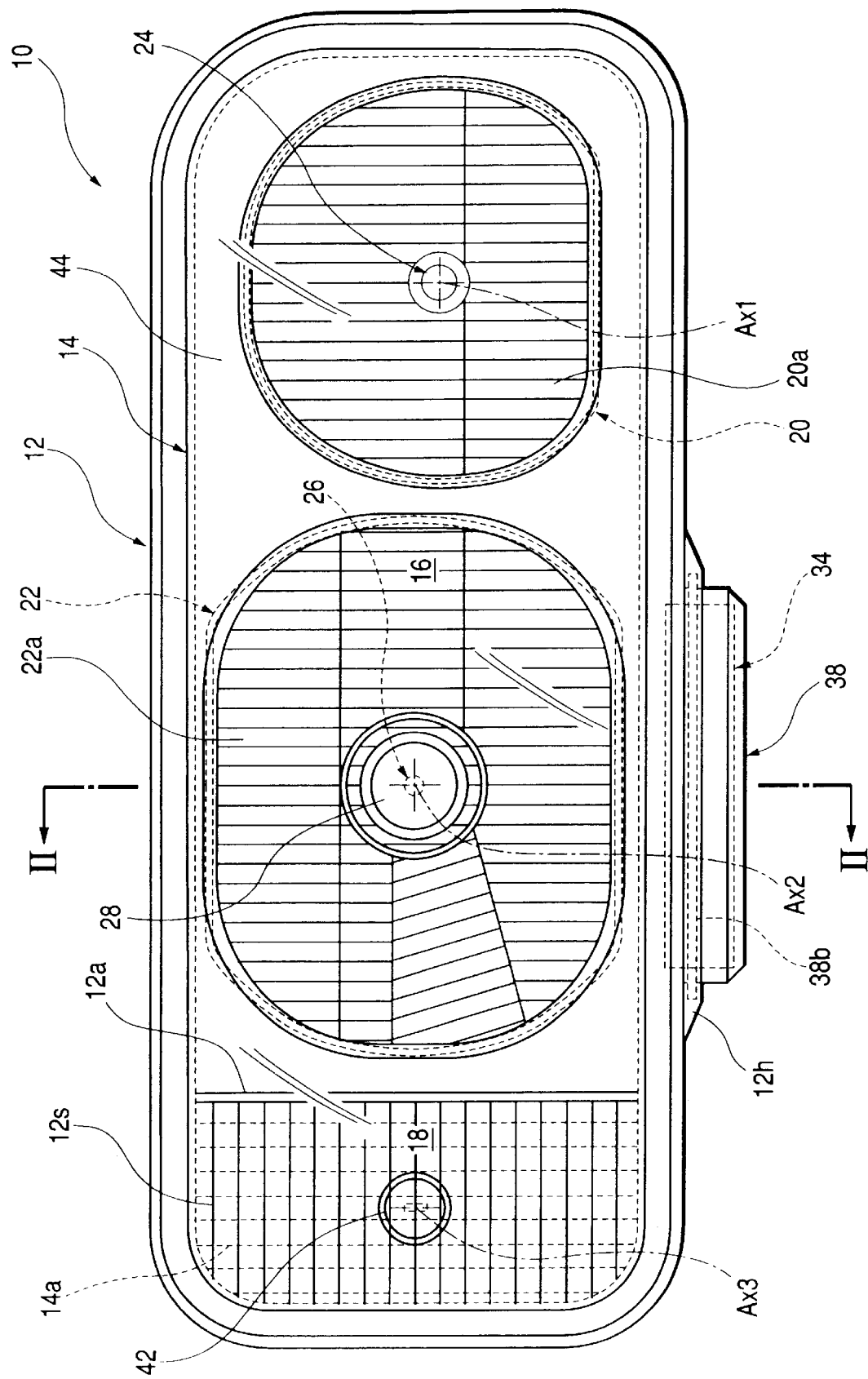
FIG. 1 is a front view illustrating a headlamp for a vehicle in accordance with an embodiment of the invention.
Figure 2:
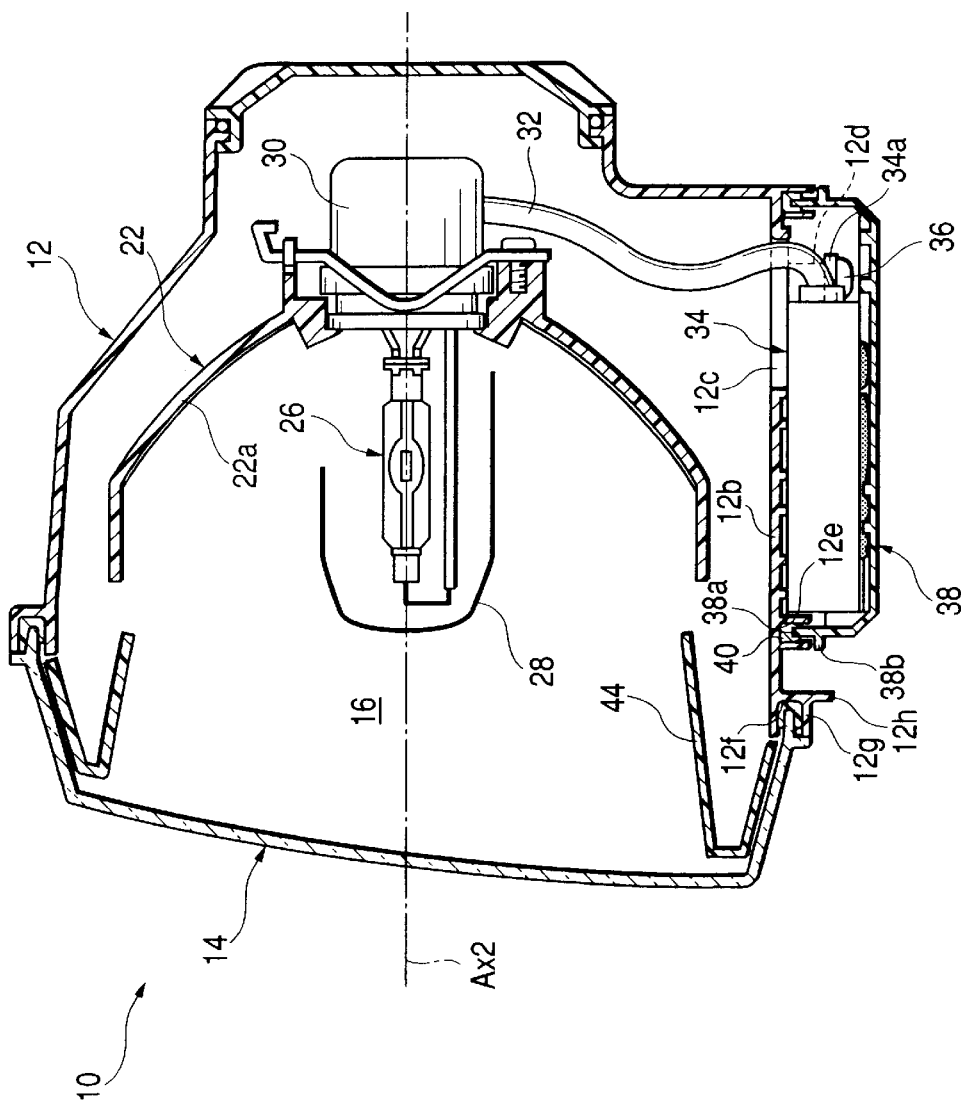
FIG. 2 is a cross-sectional view taken along line II—II of FIG. 1.
Figure 4:
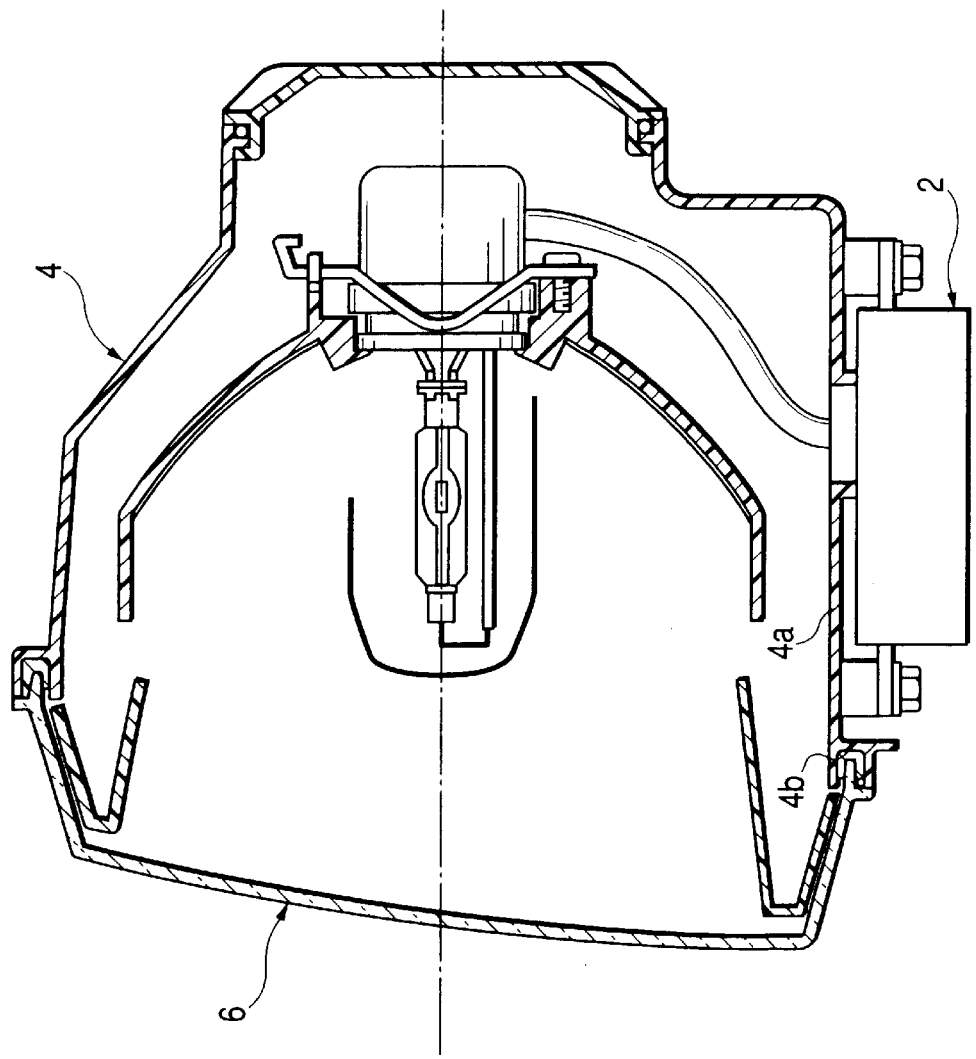
FIG. 4 is a cross-sectional diagram of a conventional headlamp that does not include an upright wall.

FIG. 1 is a front view illustrating a headlamp for a vehicle in accordance with an embodiment of the invention, and FIG. 2 is a cross-sectional view taken along line II—II thereof. As shown in FIG. 1, a headlamp 10 for a vehicle is a combination headlamp having the function of a 4-lamp type headlamp and a front turn-signal lamp. A lamp chamber 16 for a headlamp and a lamp chamber 18 for a front turn-signal lamp are juxtaposed on the right and the left by means of a lamp body 12 and a front lens 14. A partition wall 12a for partitioning the two lamp chambers 16 and 18 are formed in the lamp body 12.

A description will be given of the arrangement of the headlamp 10 for a vehicle. Two reflectors 20 and 22 are arranged on the right and the left inside the lamp chamber 16 so as to be supported by the lamp body 12 in such a manner as to be tiltable vertically and horizontally, respectively. An extension reflector 44 is provided forwardly of the two reflectors 20 and 22 inside the lamp chamber 16. The front lens 14 is formed of a transparent lens, and the two reflectors 20 and 22 function to control the luminous intensity distribution. In particular, the reflector 20 is a reflector for a main beam and has a reflecting surface 20a on which a plurality of reflecting elements are formed. A halogen bulb 24 is fitted so as to be located on its optical axis Ax1. The reflector 22 is a reflector for a sub-beam and has a reflecting surface 22a on which a plurality of reflecting elements are formed. A discharge bulb (for example, a metal halide bulb) 26 is fitted on its optical axis Ax2. A shade 28 is provided in such a manner as to cover the front side of the discharge bulb 26.

Referring to FIG. 2, a high voltage is required for lighting the discharge bulb 26, and thus the discharge bulb 26 is connected to a lighting circuit unit 34 through a bulb socket 30 and a high-tension cord 32. The lighting circuit unit 34 has a starting circuit and a stabilizing circuit in a lighting circuit casing, and is attached to an outer surface of a lower wall 12b of the lamp body 12. A cord insertion hole 12e for insertion of the high-tension cord 32 is formed in the rear of the lower wall 12b.

The lighting circuit unit 34 is attached to the lamp body 12 by a screw 36. When attached, upper end surface of the lighting circuit unit 34 abuts against the lower wall 12b of the lamp body 12 and a tab 34a formed on a rear end surface of the lighting circuit unit 34 abuts against a boss 12d formed on the lower wall 12b of the lamp body 12. A unit cover 38 for covering the lighting circuit unit 34 is attached to the outer surface of the lower wall 12b of the lamp body 12. To attach the unit cover 38 to the lamp body, a seal leg portion 38a of the unit cover 38 is inserted, with a seal member 40 placed therebetween, into a seal groove 12e formed in the lower wall 12b of the lamp body 12. The unit cover 38 to surrounds the lighting circuit unit 34, and is screwed into and fixed to the lower wall 12b of the lamp body 12 at a plurality of positions. When the unit cover 38 is thus attached to the lamp body 12, the internal space of the unit cover 38 where the lighting circuit unit 34 is disposed is sealed from the external space of the lighting appliance. A flange portion 38b is formed on the outer peripheral surface of the unit cover 38 which prevents the seal leg portion 38a from being inserted into the seal groove 12e deeper than is necessary when the unit cover 38 is attached to the lamp body 12.

A lens seal groove 12f is formed in an opening portion at the front end of the lamp body 12 for attachment of the front lens 14 over its entire periphery. In addition, a downwardly-projecting upright wall 12h is formed on a rear end portion of an outer wall portion 12g of the lens seal groove 12f in front of the unit cover 38. The upright wall 12h extends to a position lower than an upper surface of the flange portion 38b at the front end portion of the unit cover 38. Referring to FIG. 1, the upright wall 12h extends in the widthwise direction of the vehicle headlamp along the lens seal groove 12f, and is formed over a range slightly wider than the overall width of the unit cover 38.

The following description concerns the front turn-signal lamp of the headlamp 10. As shown in FIG. 1, a plurality of lens elements 14a divided into vertical stripes are formed on the front lens 14 at a forward position of the lamp chamber 18. In addition, an incandescent bulb 42 is fitted on an optical axis Ax3 on the lamp body at a rearward position in the lamp chamber 18, and a plurality of reflecting elements 12g divided into horizontal stripes are formed on a curved surface around the incandescent bulb 42 on the lamp body 12.

As described above in detail, in the headlamp 10 for a vehicle in accordance with this embodiment, the lighting circuit unit 34 is attached to the outer surface of the lower wall 12b of the lamp body 12. The unit cover 38 covering the lighting circuit unit 34 is attached to the outer surface of the lower wall 12b, and even if the lighting circuit unit 34 itself is not provided with a completely waterproof structure, the unit cover 38 may be sealed to the lamp body 12 when the unit cover 38 is secured, thereby making it possible to prevent water from entering the interior of the lighting circuit unit 34. Thus, the structure of the lighting circuit unit 34 can be simplified, resulting in a reduced cost and a lower weight lighting circuit unit 34.

Moreover, in the headlamp 10 for a vehicle in accordance with this embodiment, the upright wall 12h is formed on the outer wall portion 12g of the lens seal groove 12f forwardly of the unit cover 38, in such a manner as to project downward to a position lower than that surface of the front end portion of the unit cover 38 which opposes the lamp body unit 12 (i.e., the upper surface of the flange portion 38b). Referring to FIG. 3(a), the upright wall 12h prevents the water from being splashed against the contact surfaces of the unit cover 38 and the lamp body 12 from the forward direction through the gap between the front lens 14 and a bumper 100 of the vehicle body. Water may be directed in this direction during high-pressure car washing or when traveling in rainy weather. Accordingly, if the upright wall 12h is not formed as shown in FIG. 3B, there is a possibility that water may enter the interior of the unit cover 38 through the contact surfaces of the unit cover 38 and the lamp body 12 and wet the lighting circuit unit 34. The structure shown in FIG. 3(a) prevents such a situation.

Further, with the headlamp 10 for a vehicle in accordance with this embodiment, the upright wall 12h structure reduces the possibility of the lens seal groove 12f of the lamp body 12 becoming deformed due to the weight of the lighting circuit unit 34 (although its weight is alleviated to some measure as described above). Accordingly, it is possible to ensure waterproofness for the lighting circuit unit 34 and fabricate the lighting circuit unit 34 to be light weight and at low cost. At the same time, it is possible to effectively prevent the occurrence of a faulty seal between the lamp body 12 and the front lens 14.

Referring to FIG. 3(*b*), in a conventional horizontally elongated combination headlamp for a vehicle, where the lighting circuit unit 34 is provided at a substantially central position in the horizontal direction, the lower wall 12*b* of the lamp body 12 is liable to undergo flexing and deform due to the weight of the lighting circuit unit 34. For this reason, the lens seal groove 12*f* may possibly become deformed. Hence, it is particularly effective to adopt the arrangement of this embodiment.

In addition, since the upright wall 12*h* is formed on the outer wall portion 12*g* of the lens seal groove 12*f*, it is possible to enhance the rigidity of the portion surrounding the lens seal groove 12*f* of the lamp body 12. Consequently, it is possible to effectively minimize the deformation of the lens seal groove 12*f* of the lamp body 12. In addition, since the outer wall portion 12*g* of the lens seal groove 12*f* is at a position lower than the lower wall 12*b* of the lamp body 12, the vertical length of the upright wall 12*h* can be set to be slightly shorter.

Figure 5:
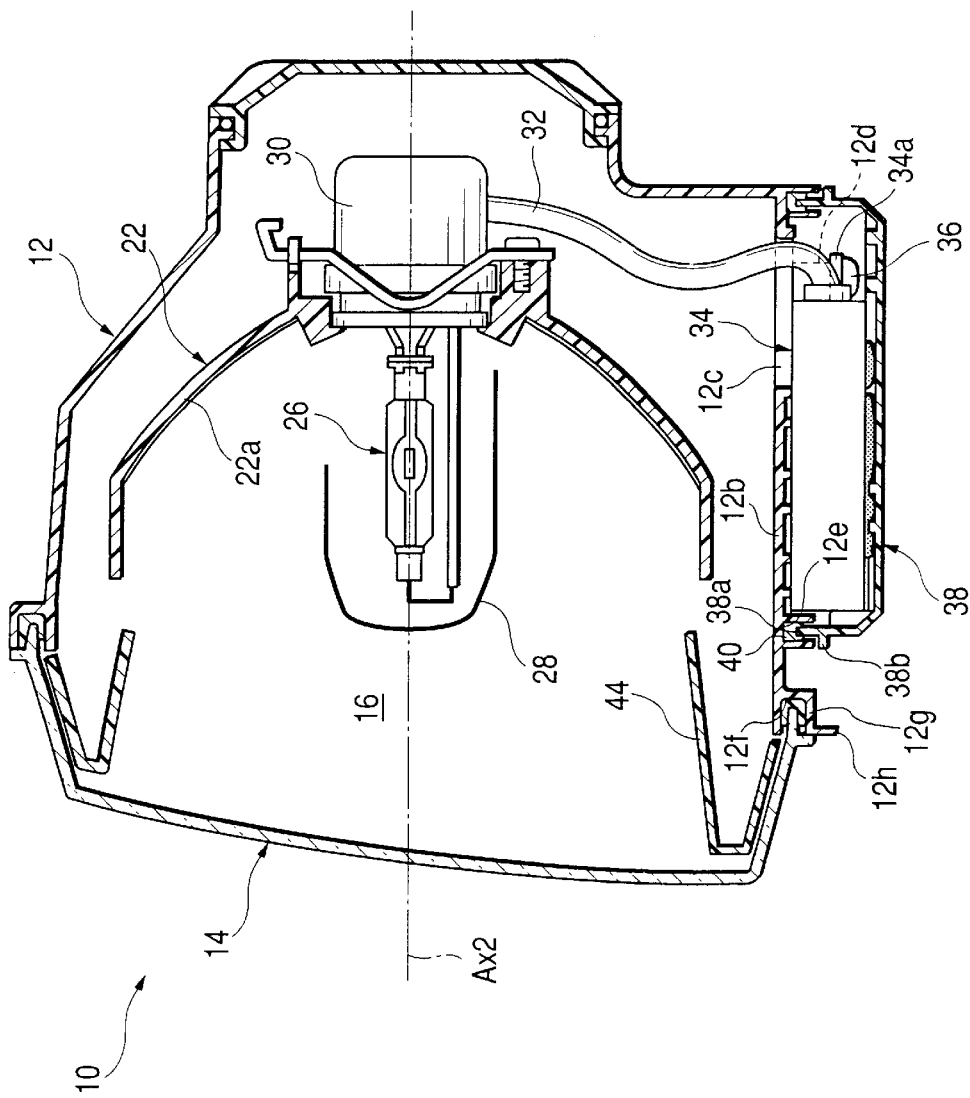
FIG. 5 is a cross sectional view of another implementation of the invention take along line II—II of FIG. 1.

It should be noted that although a description has been given in which the upright wall 12*h* is formed on the rear end portion of the outer wall portion 12*g* of the lens seal groove 12*f*, an operational advantage similar to that described can be obtained as shown in FIG. 5 if the upright wall 12*h* is formed on a front end portion of an intermediate portion of the outer wall portion 12*g*.

What is claimed is:

1. A headlamp for a vehicle in which a reflector for supporting a discharge bulb is accommodated in a lamp chamber formed by a lamp body and a front lens, and a lighting circuit unit for lighting said discharge bulb is attached to an outer surface of a lower wall of said lamp body, comprising:

a unit cover attached to the outer surface of said lower wall covering the lighting circuit unit; and an upright wall formed on the lamp body in front of the unit cover, wherein the width of the upright wall is longer than the width of the unit cover, and wherein the upright wall projects downwardly to a position lower than a flange portion of a front end portion of the unit cover.

2. The headlamp for a vehicle according to claim 1, wherein the upright wall is formed on an outer portion of a lens seal groove where the front lens is attached in the lamp body.

3. A headlamp for a vehicle comprising:

a lamp body including at least one bulb;

a lighting circuit attached to a lower portion of the lamp body;

a unit cover attached to the lower portion of the lamp body to encase the lighting circuit; and an upright wall formed on the lamp body extending in front of the unit cover, wherein the width of the upright wall is longer than the width of the unit cover.

4. The headlamp of claim 3 wherein the unit cover is sealed to the lamp body.

5. The headlamp of claim 3 wherein the upright wall is formed on an outer portion of a lens seal groove that is used to connect a front lens to the lamp body.

6. A method for constructing a vehicle headlamp comprising:

connecting a lighting circuit to a bottom portion of a lamp body;

attaching a unit cover to the bottom portion of the lamp body to encase the lighting circuit; and fabricating an upright wall on the lamp body to extend in front of the unit cover; wherein the width of the upright wall is longer than the width of the unit cover.

7. The method of claim 6 further comprising sealing the unit cover to the lamp body.

8. The method of claim 6 further comprising fabricating the upright wall on an outer portion of a lens seal groove used to connect a lens to the lamp body.

* * * * *